(12) United States Patent
Berg

(10) Patent No.: US 9,199,351 B2
(45) Date of Patent: Dec. 1, 2015

(54) DRILLING MACHINE HAVING HOLE MEASUREMENT CAPABILITY

(75) Inventor: Frederic P. Berg, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1169 days.

(21) Appl. No.: 13/104,001

(22) Filed: May 9, 2011

(65) Prior Publication Data

US 2012/0288336 A1 Nov. 15, 2012

(51) Int. Cl.
*B23Q 15/16* (2006.01)
*B23B 49/00* (2006.01)
*B23Q 17/20* (2006.01)
*B23Q 17/09* (2006.01)

(52) U.S. Cl.
CPC ............... *B23Q 17/20* (2013.01); *B23B 49/001* (2013.01); *B23Q 17/0995* (2013.01); *Y10T 408/05* (2015.01); *Y10T 408/5623* (2015.01)

(58) Field of Classification Search
CPC .... B23Q 15/28; B23Q 15/16; B23Q 17/0995; B23B 49/001; B23B 2270/48
USPC ........... 408/2, 5–12, 95, 97; 700/175; 33/542, 33/543, 544, 544.5, 555.1; 324/658, 662; 73/862.626
See application file for complete search history.

(56) References Cited

U.S. PATENT DOCUMENTS

| | | | | |
|---|---|---|---|---|
| 3,623,216 A * | 11/1971 | Aihara et al. | | 483/11 |
| 3,740,160 A * | 6/1973 | Kimura et al. | | 408/2 |
| 4,717,291 A * | 1/1988 | Zafir | | 408/13 |
| 4,753,555 A | 6/1988 | Thompson | | |
| 4,778,313 A * | 10/1988 | Lehmkuhl | | 409/127 |
| 4,816,744 A * | 3/1989 | Papurt et al. | | 324/662 |
| 4,935,700 A | 6/1990 | Garbini et al. | | |
| 5,165,829 A * | 11/1992 | Ross et al. | | 409/125 |
| 5,189,377 A * | 2/1993 | Rhoades et al. | | 324/662 |
| 5,482,409 A * | 1/1996 | Dunning et al. | | 408/1 R |
| 5,646,538 A | 7/1997 | Lide et al. | | |
| 5,765,975 A * | 6/1998 | Hoffmann et al. | | 409/138 |
| 6,015,249 A * | 1/2000 | Sacchetti | | 409/186 |
| 6,419,426 B1 * | 7/2002 | Chalupa et al. | | 408/1 R |
| 7,112,018 B2 * | 9/2006 | Boyl-Davis et al. | | 409/178 |
| 7,220,088 B2 * | 5/2007 | Ferrari et al. | | 409/204 |
| 8,021,089 B2 * | 9/2011 | Eriksson et al. | | 409/132 |
| 2002/0104207 A1* | 8/2002 | Smith et al. | | 29/26 A |
| 2007/0153296 A1* | 7/2007 | Schick | | 356/609 |
| 2009/0051938 A1* | 2/2009 | Miousset et al. | | 356/625 |

FOREIGN PATENT DOCUMENTS

| | | | |
|---|---|---|---|
| CN | 201198042 Y | * | 2/2009 |
| GB | 2100441 A | | 12/1982 |
| JP | 5293707 A | | 11/1993 |
| JP | 3139576 U | * | 2/2008 |
| WO | 02 24405 A1 | | 3/2002 |

OTHER PUBLICATIONS

"Dimentron (R) Indicating Measurement Instruments," pp. 37-50, http://www.ruifengxinda.com/fujian/201012511192073499.pdf.

* cited by examiner

*Primary Examiner* — Daniel Howell
*Assistant Examiner* — Nicole N Ramos
(74) *Attorney, Agent, or Firm* — Hugh P. Gortler

(57) ABSTRACT

A system comprises a drilling machine; a capacitive probe; and a probe deployment system, mounted to the drilling machine, for moving the capacitive probe inside a hole drilled by the machine to measure the drilled hole at different depths.

20 Claims, 8 Drawing Sheets

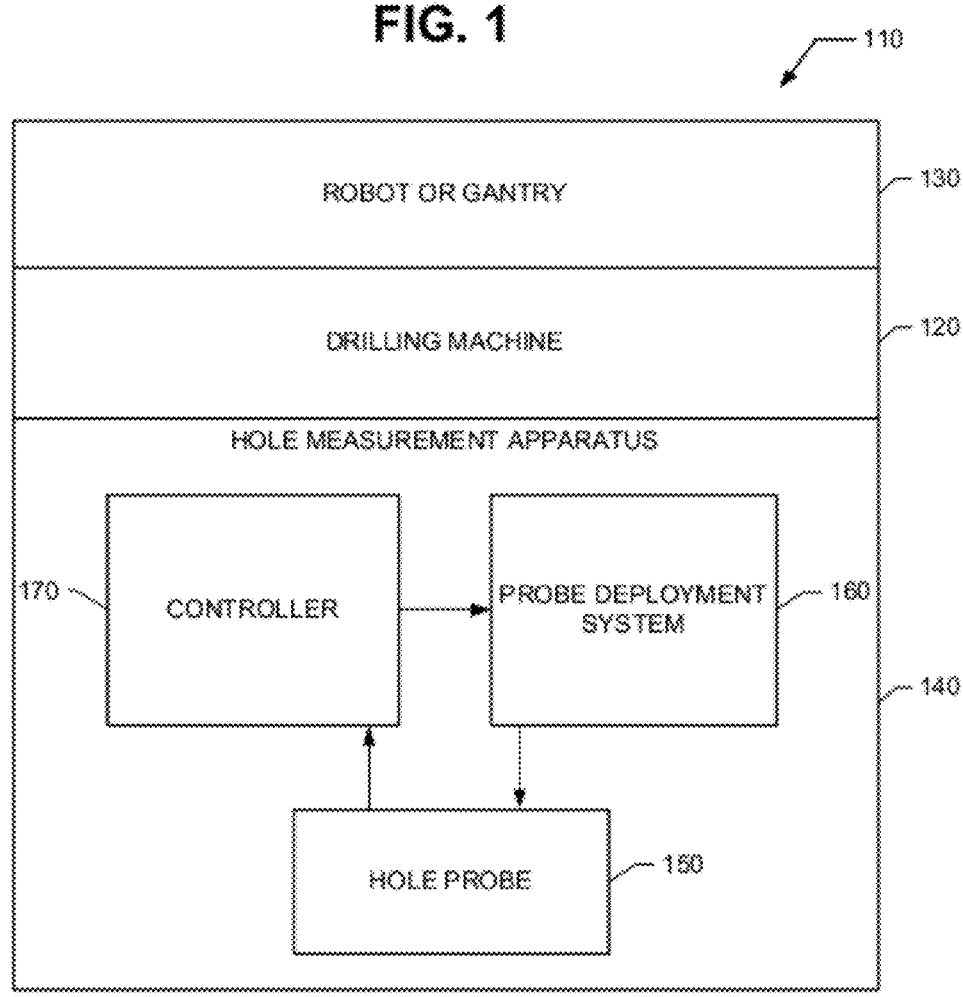
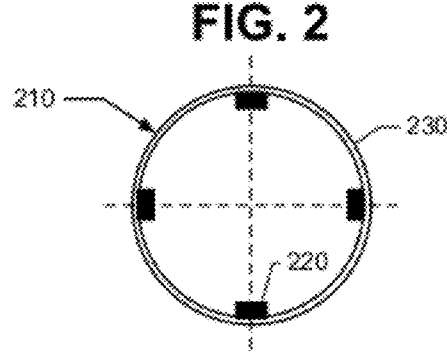

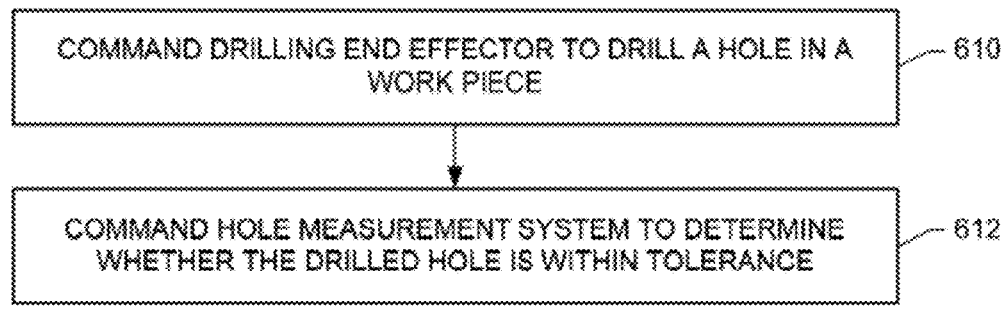
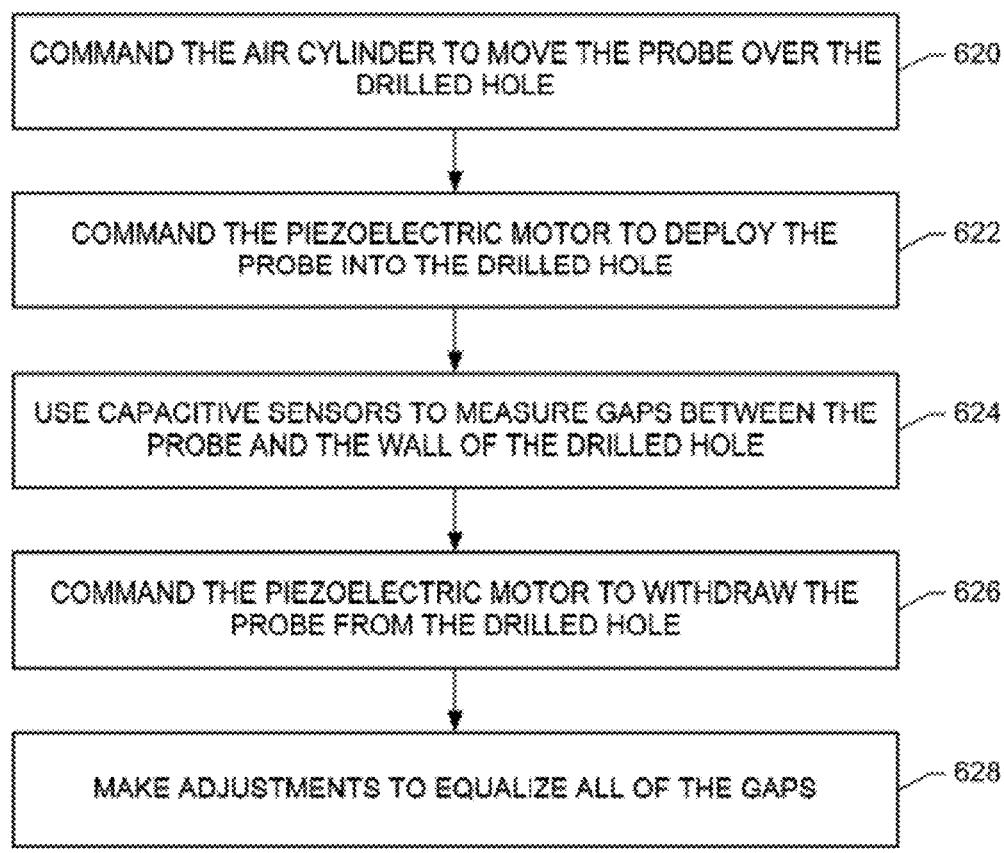

DRILLING MACHINE HAVING HOLE MEASUREMENT CAPABILITY

BACKGROUND

During manufacture of a commercial aircraft, hundreds of thousands of precisely located, straight holes may be drilled. These holes are drilled by robotic systems that include drilling end effectors.

After a group of holes has been drilled, the drilled holes are inspected to ensure that they are within tolerance. The inspection does not simply involve checking a single hole diameter. Rather, the inspection involves checking the diameter and circularity of each hole at different depths to ensure that each hole is straight (and not conical or hourglass-shaped). Typically, the inspection is performed by a quality assurance (QA) inspector, who inspects large groups of holes at one time.

Consider a situation where a drill bit becomes chipped while drilling a hole. Due to the chipped bit, the drilled hole is out of tolerance. Subsequent holes drilled by the chipped bit are also out of tolerance. Unfortunately, those subsequent out-of-tolerance holes are not identified until QA inspection.

It would be desirable to minimize the number of holes drilled by a damaged bit. More generally, it would be desirable to minimize the number of out-of-tolerance holes.

SUMMARY

According to an aspect herein, a system comprises a drilling machine; a capacitive probe; and a probe deployment system, mounted to the machine, for moving the capacitive probe inside a hole drilled by the machine to measure the drilled hole at different depths.

According to another aspect herein, a system comprises a drilling end effector; a capacitive probe including a rod and a plurality of capacitive sensors about the rod; and a probe deployment system, mounted to the end effector, for moving the capacitive probe inside a hole drilled by the end effector to measure the drilled hole at different depths. The probe deployment system includes an actuator for moving the probe over the drilled hole, and a piezoelectric motor for incrementally moving the probe to different depths in the drilled hole. The system further comprises a control box, mounted to the drilling end effector, for controlling the actuator and the motor and for processing probe data to determine whether the drilled hole is within tolerance.

According to another aspect herein, a hole measurement apparatus comprising a capacitive probe including a rod and a plurality of capacitive sensors about the rod; and a piezoelectric motor for moving the sensors within a hole to measure hole profile.

BRIEF DESCRIPTION OF THE DRAWINGS

FIG. 1 is an illustration of a system including a drilling machine and a hole measurement apparatus.

FIG. 2 is an illustration of a capacitive probe.

FIGS. 6A-6D are illustrations of a method of using a drilling end effector and hole measurement apparatus.

DETAILED DESCRIPTION

Figure 3A:
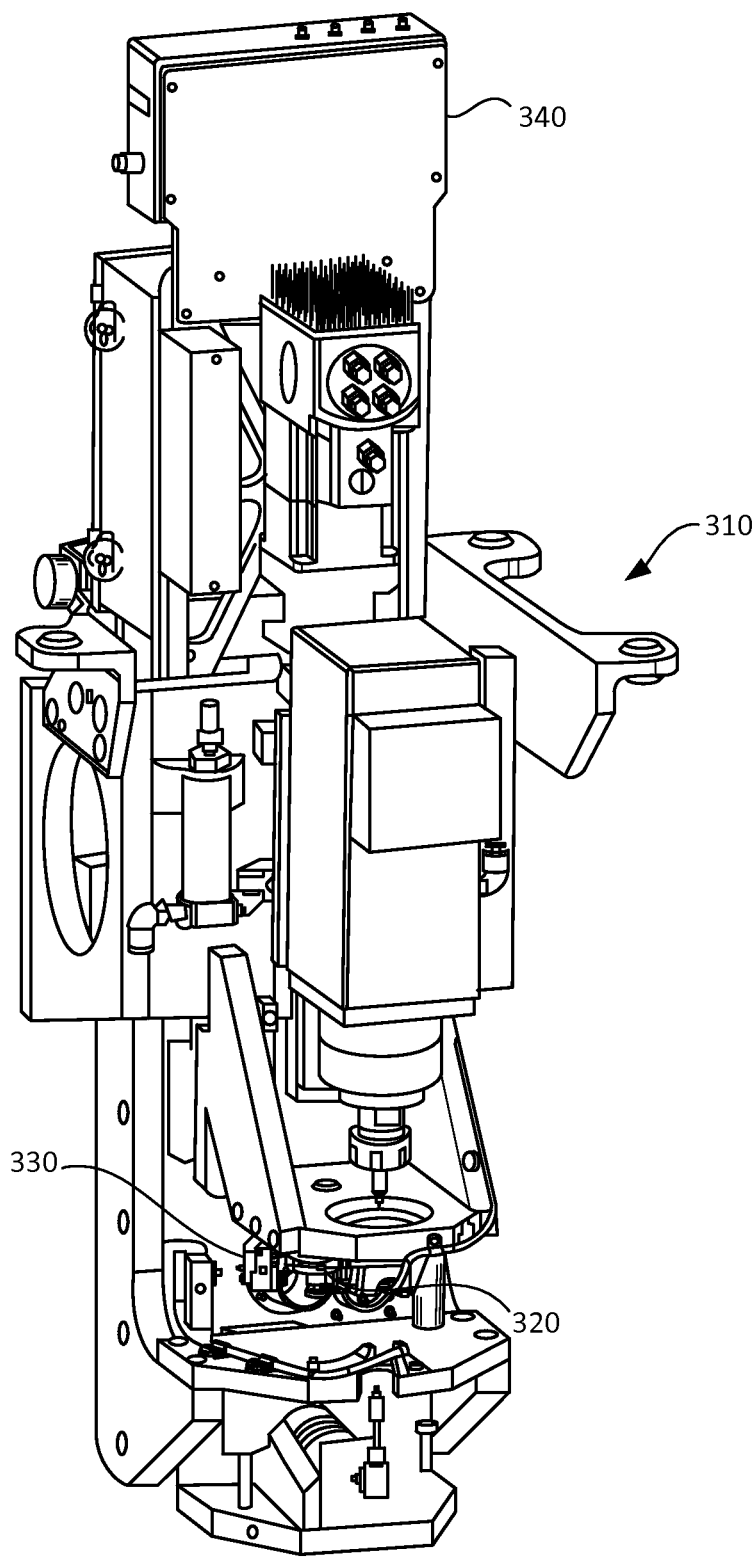
FIGS. 3A and 3B are illustrations of a drilling end effector and a hole measurement apparatus.

Reference is made to FIG. 1, which shows a system 110 including a drilling machine 120 for making precise holes in a work piece. The system 110 also includes a robot or gantry 130 for moving the drilling machine 120.

The system 110 further includes hole measurement apparatus 140 including a probe, 150, probe deployment system 160 and controller 170. Under control of the controller 170, the probe deployment system 160 moves the hole probe 150 over a drilled hole and then into the drilled hole. Once the probe 150 is inside the drilled hole, the deployment system 160 may move the probe 150 to different depths of the drilled hole. At each depth, the probe 150 may measure diameter and circularity of the drilled hole. By taking these measurements at the different depths of the drilled hole, a profile of the drilled hole is obtained.

In addition to controlling the deployment system 160, the controller 170 also processes data from the probe 150. The processing includes converting the probe data to meaningful dimensional data. The processing may also include determining whether the drilled hole is within tolerance. In some embodiments, the controller 170 may send a report to the robot or gantry 130, the report indicating whether the drilled hole is within tolerance. In other embodiments, the controller 170 may report the hole measurements (e.g., diameter and circularity at each depth) to the robot or gantry 130. Reporting the hole measurements offers certain benefits, which will be discussed below in connection with FIG. 5.

Additional reference is made to FIG. 2, which shows an embodiment of a hole probe 150. The embodiment of FIG. 2 is a capacitive probe 210 having capacitor sensors 220 mounted radially on a non-conducting cylinder 230. Although four capacitor sensors 220 are illustrated, other numbers of capacitor sensors 220 may be used.

In some embodiments, the probe deployment system 160 may include a piezoelectric motor (not shown) for incrementally moving the probe 210 to different depths within a drilled hole. The piezoelectric motor may be accurate to within 0.1 microns. The probe deployment system 160 may further include a miniature actuator (e.g., an air cylinder, linear motor, hydraulic cylinder) for moving the probe 210 over a drilled hole.

The combination of the capacitive probe 210 and the piezoelectric motor results in a hole measurement apparatus 140 that is very small in size. In some embodiments, the capacitive probe 210 has a height of approximately one inch and a diameter of approximately one inch. The piezoelectric motor may have a height of less than two inches.

The small size allows the hole measurement apparatus 140 to be mounted to the drilling machine 120 in a location that allows each hole to be measured immediately after drilling. Inspecting each hole after drilling is highly advantageous. It allows problems such as worn and chipped drill bits to be identified immediately, and prevents subsequent holes from being drilled with such drill bits.

Figure 3B:
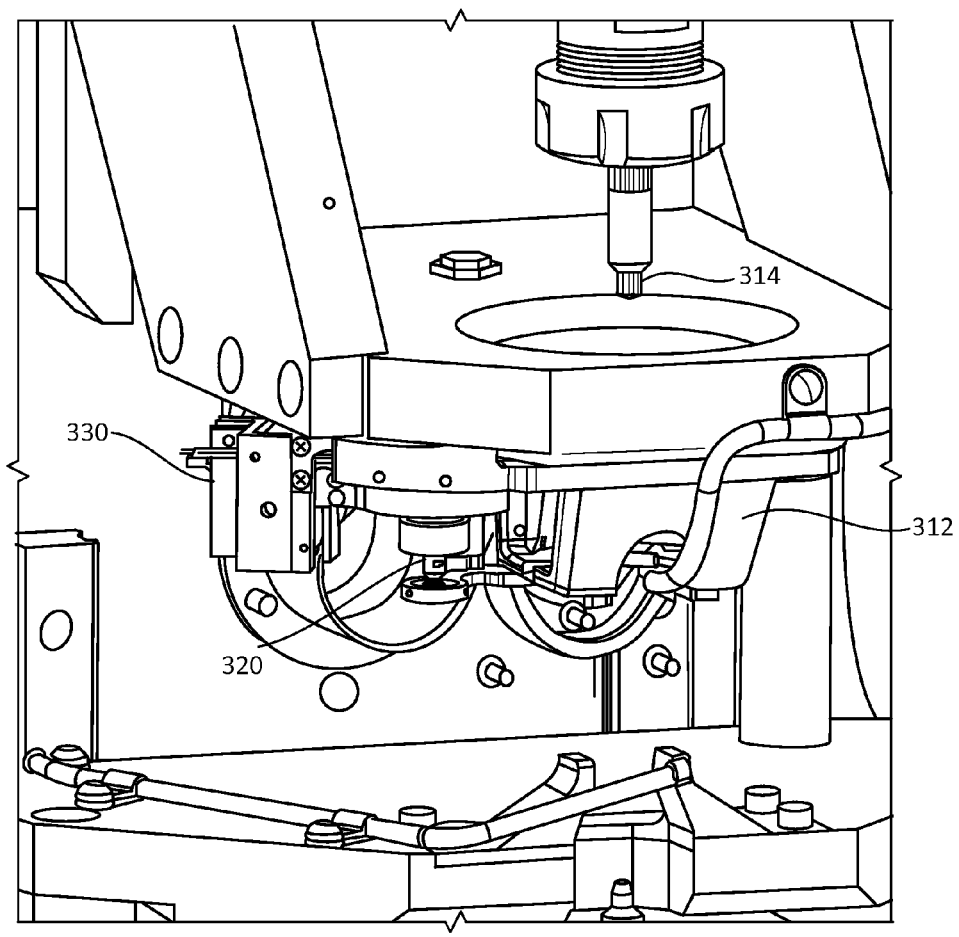

Reference is made to FIGS. 3A and 3B, which illustrate one type of drilling machine: a drilling end effector 310. The drilling end effector 310 includes a pressure foot 312 for holding a work piece or clamping together two or more work pieces. The drilling end effector 310 further includes a drill bit 314 for drilling a hole in the work pieces(s). During drilling, the drill bit 314 is moved through a passageway in the pressure foot 312 and bears down on the work piece(s).

FIGS. 3A and 3B also illustrate a hole measurement apparatus including a capacitive probe 320 and a probe deployment system 330. In one particular embodiment, the drill bit 314 drills a hole between 0.190 to 0.192 inches. The probe 320 has a diameter of 0.175 inches. If the probe 320 touches the inside of the hole, there will be a minimum of about 0.015 inches of clearance.

Figure 4A:
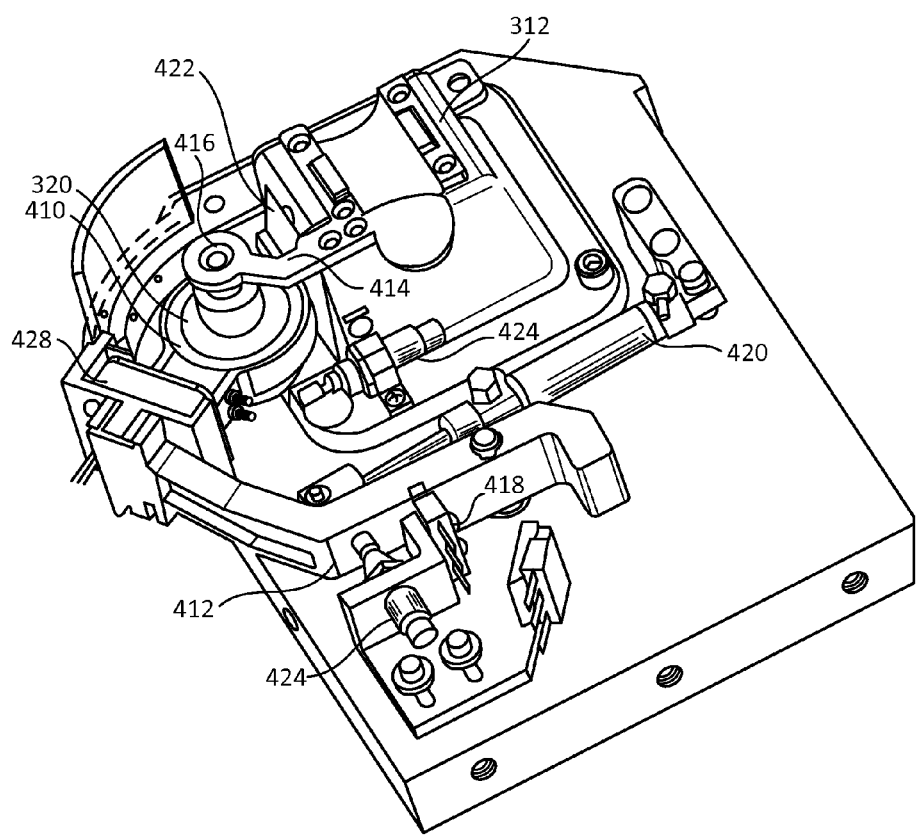
FIGS. 4A and 4B are illustrations of an embodiment of a probe deployment system.
Figure 4B:
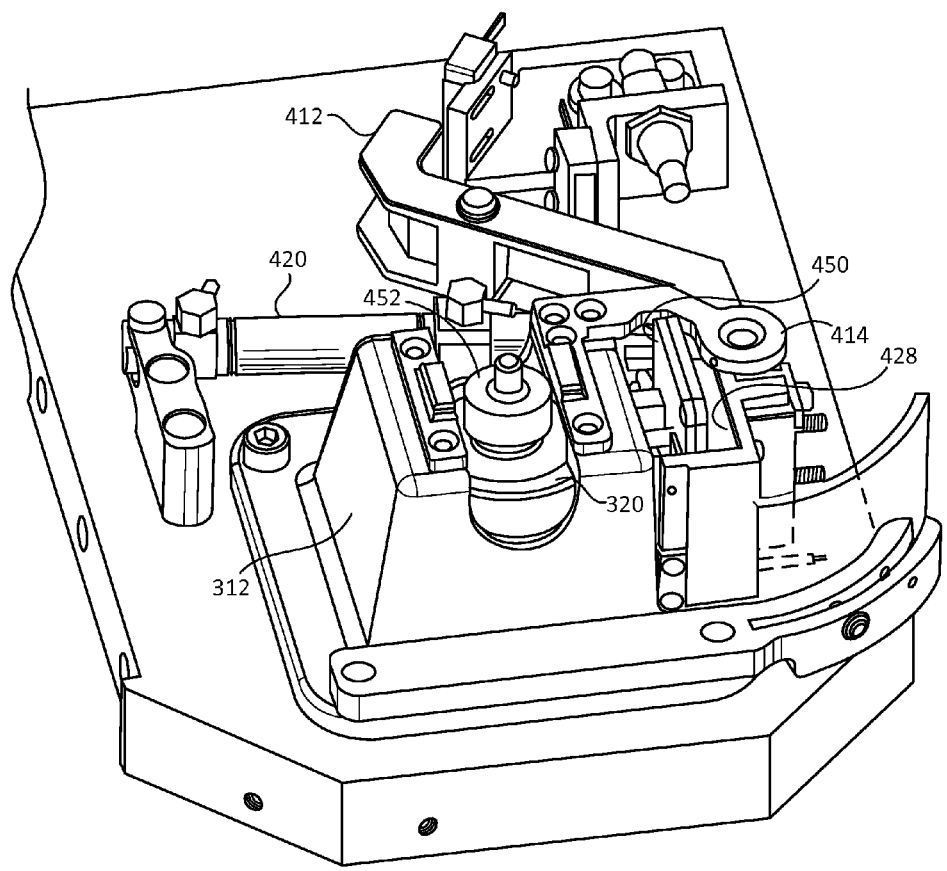

FIGS. 4A and 4B show a close up view of the probe deployment system 330. In particular, FIGS. 4A and 4B show how the probe 320 is moved from a home position outside of the pressure foot 312, to a deployed position inside the pressure foot 312 and over a drilled hole.

FIG. 4A shows the probe in the home position. The probe 320 is attached to a probe arm 412 by a flexible mount 410. A calibration ring mount 414 holds a calibrated ring gage 416. The calibration ring gauge 416 has an opening with a precise diameter, which is used to calibrate the probe 320. A first limit switch 418 indicates when the arm 412 is positioned such that the probe 320 is completely out of the pressure foot 312 and under the calibration ring gauge 416.

The probe 320 is deployed by turning on a solenoid valve (not shown) to actuate an air cylinder 420, causing the probe arm 412 to swing and move the probe 320 through an access door 422 and into the pressure foot 312. Shock absorbers 424 reduce the abrupt shock of stopping the probe arm 412 over a short distance. The shock absorbers 424 also function as stops for accurately positioning the probe 320. A second limit switch 426 indicates an arm position where the probe 320 is inside the pressure foot 312.

FIG. 4A also shows a piezoelectric linear motor 428, which moves the probe 320 over different depths of a drilled hole. The piezoelectric linear motor 428 may be operated using high frequency pulses. These high frequency pulses are tuned to the piezoelectric crystal frequency, which results in maximum linear displacement.

FIG. 4B shows the probe 320 in the deployed position. Once in the deployed position, the controller 170 controls the piezoelectric linear motor 428 and its platform 450 to position the probe 320 in the drilled hole. A probe stop collar 452 may be used to adjust the depth that the probe 320 goes into the drilled hole.

The flexibility of the mount 412 is beneficial in situations where the probe 320 contacts the inside wall of a hole. If contact occurs, the probe 320 will move toward the center of the hole, but will still be in contact with the hole wall. In this situation, accurate hole diameter information can still be obtained.

Reference is once again to FIG. 3A. The hole measurement apparatus further includes a control box 340. The control box 340 includes the controller 170.

Figure 5:
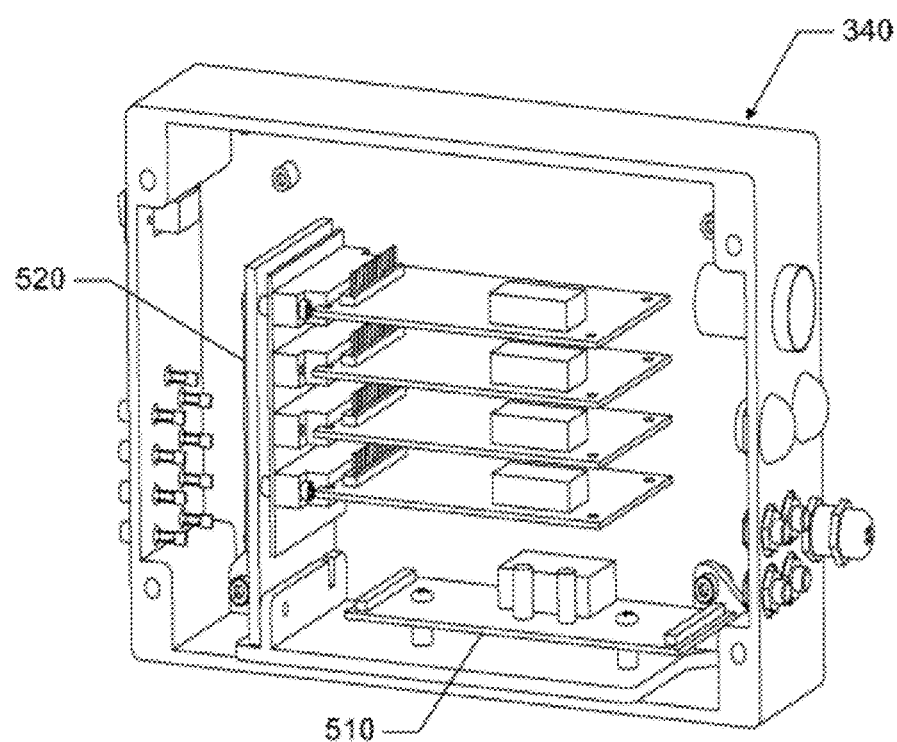
FIG. 5 is an illustration of an embodiment of a control box.

Additional reference is made to FIG. 5, which illustrates an embodiment of the control box 340. The control box 340 includes a first circuit board 510 that can condition the capacitive probe, and convert capacitance signals obtained by the capacitor sensors 220 to a voltage signal (where the voltage is proportional to the distance between the hole probe radius and the hole radius). The first circuit board 510 also computes the diameter and circularity of the hole at different depths, and determines whether the hole is within the tolerance.

The first circuit board 510 monitors all limit switches 418 and 426 to assure the probe 320 is in a known position. The first circuit board 510 also controls the probe deployment system by generating signals that actuate the air cylinder solenoid, and also by supplying signals to a piezoelectric motor driver (not shown), which is on a second circuit board 520. The piezoelectric motor driver generates the high frequency pulses that drive the piezoelectric linear motor 428.

The control box 340 also continuously monitors gap dimensions for the purpose of adjusting probe concentricity with the drilled hole and the ring gage hole.

The control box 340 has input and output ports for communicating with the robot or gantry 130. The control box 340 may have a data port (e.g., a serial port) for accepting user inputs as well as outputting diagnostics and other information. For instance, the control box 340 can output hole measurement data for post processing.

The post processing may be used to perform drill life estimates. Typically, drills are automatically replaced according to a fixed schedule (e.g., after drilling a set number of holes). By monitoring the hole diameter and instead replacing drills at the end of their lives (e.g., when wear or damage is apparent), fewer drills are replaced. Consequently, time and money are saved.

As shown in FIG. 3A, the control box 340 and other hole measurement apparatus are mounted to the drilling end effector 310. This makes for a standalone unit. All functionality is contained and controlled within the unit. All that is needed is power and a signal to perform a drill hole measurement. A robot technician does not have to know how to operate the unit. The unit is little more than a "black box."

Moreover, if the unit is moved from one robot to another, all functionality goes with it. Deployment control and probe signal processing do not have to be changed each time the unit is moved.

Figure 6C:
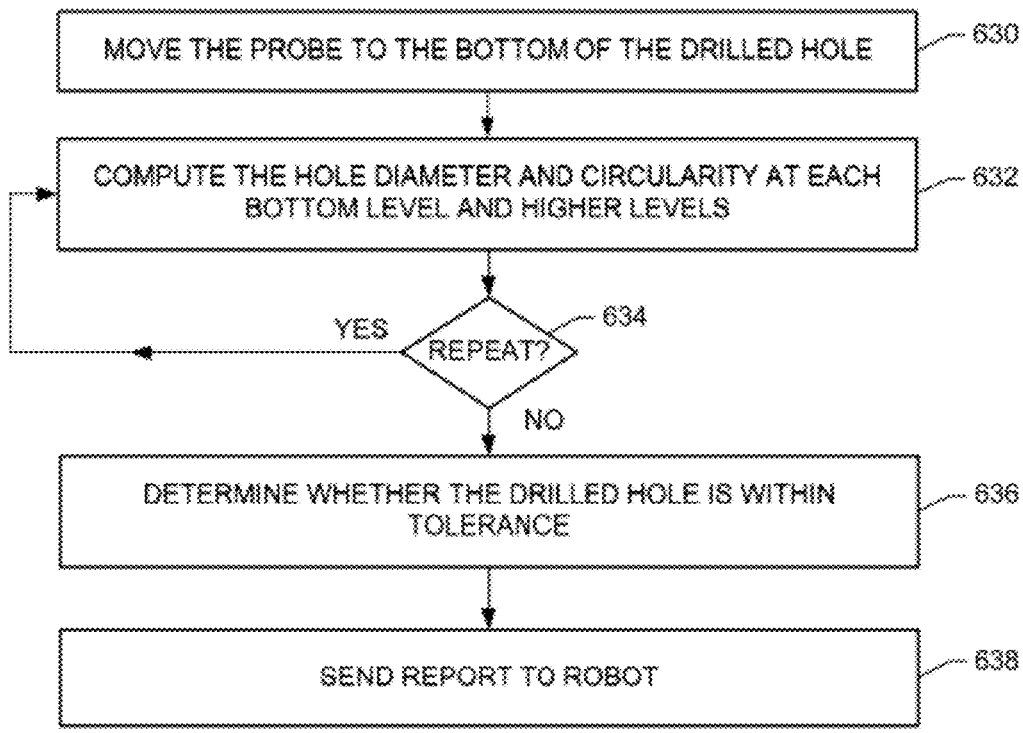

FIGS. 6A-6D illustrate the operation of a drilling end effector 310 and hole measurement apparatus. Referring first to FIG. 6A, the drilling end effector 310 is commanded to drill a hole in a work piece (block 610). After the hole has been drilled and the drill bit 314 has been withdrawn from both the hole and the pressure foot, the hole measurement apparatus is commanded to determine whether the drilled hole is within tolerance (block 612).

Referring to FIG. 6B, the control box 340 commands the air cylinder to move the probe 320 over the drilled hole (block 620), and it then commands the piezoelectric motor 428 to deploy the probe 320 into the drilled hole (block 622). The probe 320 is positioned at the bottom of the hole, by pushing the probe 320 until the probe stop 452 contacts the top surface of the work piece. Here a first diameter measurement is made. Gaps between the probe 320 and the wall of the drilled hole are measured by each of the capacitor sensors 220 (block 624). The control box 340 then commands the piezoelectric motor to withdraw the probe 320 from the hole (block 626).

Adjustments are made to equalize all of the gaps (block 628). Two concentric adjustments and two angle adjustments may be made to the probe 320 so that the probe 320 is concentric with the hole and is aligned with the hole.

Referring now to FIG. 6C, the probe 320 measures the hole. The piezoelectric motor 428 is commanded to move the probe 320 to the bottom of the drilled hole (block 630). The control box 340 uses the hole probe data to compute the hole diameter and circularity at that level (block 632). For example, the control box 340 stores a table of calibration factors that relate voltage to gap distance. When a gap voltage is measured, the calibration table is searched to locate the two voltages that bracket the measured voltage. The associated gap distance is determined by interpolating between the two voltages. All four gaps are computed in this manner. Then, taking into account each sensor (arc length and width) and the eccentricity of the inserted probe and inside wall of the hole, the diameter is computed.

The probe is incrementally moved to another depth, where the diameter and circularity are again computed (block 632). After the probe has been moved to the last depth, and after hole diameter and circularity are computed for that last depth, the hole measurements may be repeated (block 634). After all measurements have been made, the control box 340 determines whether the drilled hole is within specification (block 636). A report may be sent to the robot (block 638).

At various times, the probe 320 may be calibrated. The probe 320 may be calibrated before a drilled hole is measured, and it may be calibrated during a hole measurement. For instance, after every three sets of measurements have been made, the probe 320 may be calibrated.

Figure 6D:
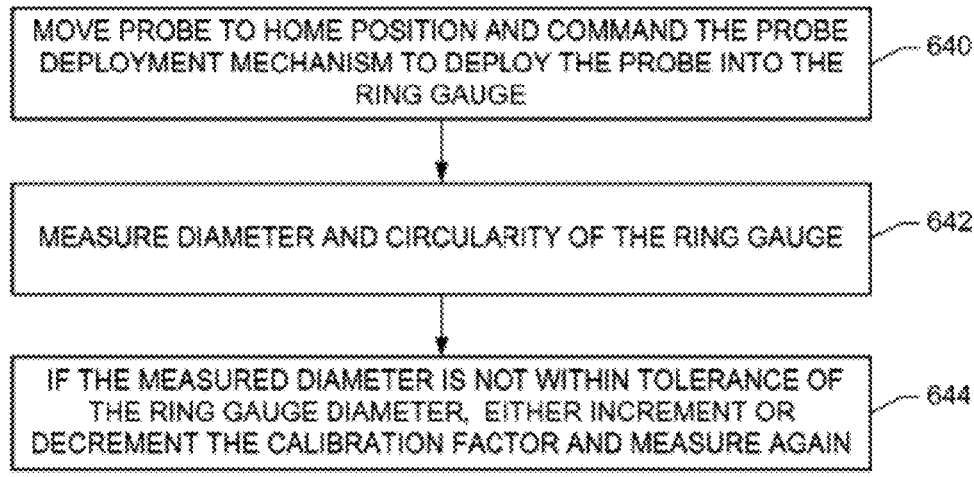

Reference is made to FIG. 6D, which illustrates a method for calibrating the probe 320. The probe deployment mechanism is commanded to move the probe 320 to the home position and deploy the probe into the ring gauge 416 (block 640). The diameter and circularity of the ring gauge 416 are measured (block 642). If the measured diameter is not within tolerance, the calibration factor is either incremented or decremented (block 644). The functions at blocks 642 and 644 are repeated until the measured diameter of the calibration gauge falls within tolerance.

In some embodiments, a measurement at only a single depth of a countersunk hole may be performed. For example, a probe may be designed with a cone-shaped base. When the cone-shaped base is inserted into a countersunk hole, the countersunk diameter is measured.

The invention claimed is:

1. A system comprising:
    a drilling machine;
    a capacitive probe; and
    a probe deployment system, mounted to the machine, including a piezoelectric motor for incrementally moving the capacitive probe inside a hole drilled by the machine to measure the drilled hole at different depths.

2. The system of claim 1, wherein drilled hole diameter and drilled hole circularity are measured at the different depths.

3. The system of claim 1, wherein the probe deployment system further includes an actuator for moving the probe from a home position to a deployed position over the drilled hole.

4. The system of claim 1, wherein the drilling machine includes a pressure foot having a drill passageway; and wherein the probe deployment system includes an arm for swinging the probe from a home position outside of the pressure foot to a deployed position within the pressure foot.

5. The system of claim 4, wherein the probe is attached to the arm by a flexible mount.

6. The system of claim 4, wherein the probe deployment system further includes shock absorbers and limit switches, the shock absorbers reducing abrupt shock of stopping the arm, the shock absorbers and the limit switches accurately positioning the probe.

7. The system of claim 1, wherein the drilling machine includes a drilling end effector; and wherein the system further comprises a robot or gantry for moving the end effector; and a control box, mounted on the drilling end effector, for controlling the probe deployment system, processing probe data, and communicating the processed data with the robot or gantry.

8. The system of claim 1, further comprising a ring gauge mounted to the drilling machine, the ring gauge having a calibration opening for calibrating the probe.

9. A method comprising using the system of claim 1 to drill a plurality of holes in a work piece and measure each one of the drilled holes immediately after drilling.

10. The method of claim 9, further comprising reporting hole measurement data for post-processing, wherein the post-processing includes performing drill life estimates.

11. The method of claim 9, wherein measuring each drilled hole includes using gap dimensions between the probe and a wall of the drilled hole for adjusting probe concentricity with the drilled hole.

12. Apparatus comprising:
    a drilling end effector;
    a capacitive probe including a rod and a plurality of capacitive sensors about the rod;
    a probe deployment system, mounted to the end effector, for moving the capacitive probe inside a hole drilled by the end effector to measure the drilled hole at different depths, the probe deployment system including an actuator for moving the probe over the drilled hole, and a piezoelectric motor for incrementally moving the probe to different depths in the drilled hole; and
    a control box, mounted to the drilling end effector, for controlling the actuator and the motor and for processing a probe output to determine whether the drilled hole is within tolerance.

13. The apparatus of claim 12, further comprising a calibration ring gauge mounted to the drilling end effector, the ring gauge having a calibration opening for calibrating the probe.

14. The apparatus of claim 12, wherein the drilling end effector includes a pressure foot having a drill passageway; and wherein the probe deployment system includes an arm for swinging the probe from a home position outside of the pressure foot to a deployed position within the drill passageway, the arm moved by the actuator.

15. The apparatus of claim 14, wherein the probe is attached to the arm by a flexible mount.

16. The apparatus of claim 14, wherein the probe deployment system further includes shock absorbers for reducing abrupt shock of stopping the arm and also accurately positioning the probe.

17. A hole measurement apparatus comprising:
    a capacitive probe including a rod and a plurality of capacitive sensors about the rod;
    an actuator for moving the sensors within a hole to measure hole profile; and
    an arm, mounted to an end effector having a pressure foot, for swinging the probe from a home position outside of the pressure foot to a deployed position within the pressure foot.

18. The apparatus of claim 17, further comprising a ring gauge having a calibration opening for calibrating the probe.

19. The apparatus of claim 17, wherein the actuator includes a piezoelectric motor.

20. The apparatus of claim 17, wherein the probe is attached to the arm by a flexible mount.

* * * * *